(12) United States Patent
Dawson et al.

(10) Patent No.: US 8,233,930 B1
(45) Date of Patent: Jul. 31, 2012

(54) DUAL-CHANNEL CONFERENCING WITH CONNECTION-BASED FLOOR CONTROL

(75) Inventors: Travis E. Dawson, San Francisco, CA (US); David Harris, Pleasanton, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 1264 days.

(21) Appl. No.: 11/654,115

(22) Filed: Jan. 16, 2007

(51) Int. Cl.
*H04B 7/00* (2006.01)
*H04M 3/42* (2006.01)
*H04L 12/16* (2006.01)
*H04Q 11/00* (2006.01)

(52) U.S. Cl. ........ 455/519; 455/517; 455/518; 455/416; 455/41.2; 379/202.01; 370/260; 370/261

(58) Field of Classification Search ............... 455/518, 455/519, 416, 41.2, 41.3, 11.1; 379/202.01, 379/142.01; 370/260–262; 348/14.09–14.1
See application file for complete search history.

(56) References Cited

U.S. PATENT DOCUMENTS

| | | | |
|---|---|---|---|
| 6,385,461 B1 * | 5/2002 | Raith ............................ | 455/518 |
| 7,072,686 B1 | 7/2006 | Schrager | |
| 2003/0045275 A1 | 3/2003 | McDonagh et al. | |
| 2004/0116130 A1 | 6/2004 | Seligmann | |
| 2004/0146031 A1 | 7/2004 | Jukarainen | |
| 2004/0224710 A1 * | 11/2004 | Koskelainen et al. ........ | 455/518 |
| 2005/0232436 A1 | 10/2005 | Nagayasu et al. | |
| 2005/0271194 A1 * | 12/2005 | Woods et al. ............. | 379/202.01 |
| 2006/0003784 A1 * | 1/2006 | Chion et al. ................... | 455/518 |
| 2006/0056440 A1 * | 3/2006 | Khartabil ...................... | 370/447 |
| 2006/0116075 A1 * | 6/2006 | Gallo ........................... | 455/41.2 |
| 2006/0116149 A1 * | 6/2006 | Dunn et al. ................... | 455/518 |
| 2007/0082690 A1 * | 4/2007 | Fabien et al. ................. | 455/518 |
| 2007/0281723 A1 * | 12/2007 | Chotai et al. ................. | 455/518 |
| 2008/0159177 A1 * | 7/2008 | Balachandran et al. ...... | 370/260 |

OTHER PUBLICATIONS

Internet article from http://en.wikipedia.org/wiki/Bluetooth printed on Aug. 23, 2006.

* cited by examiner

*Primary Examiner* — Wesley Kim (57) ABSTRACT

A method and apparatus for setting up a conference communication between a remote party and a plurality of local parties. A base unit may engage in communication with a remote party. Thereafter, the base unit may apply a floor control process with respect to the local parties to limit the number local parties that can have dedicated channels at any give time. More particularly, the base unit may receive from a local party a request for a new dedicated channel to transmit conference bearer data and responsively establish the new dedicated channel with the local party only if a present number of established dedicated channels with local parties is less than a predetermined threshold. The base unit may then receive conference bearer data and responsively transmit the conference bearer data over a broadcast channel for receipt by the plurality of local parties.

21 Claims, 5 Drawing Sheets

DUAL-CHANNEL CONFERENCING WITH CONNECTION-BASED FLOOR CONTROL

FIELD OF THE INVENTION

The present invention relates to telecommunications and, more particularly, to conference communications.

BACKGROUND

In business today, it is often necessary for a group of people to gather in a conference room and engage in a conference call via a single telephone situated in the room. In usual practice, the telephone includes speakerphone functionality, so that the people in the room can all participate fully in the conference by listening to the speakerphone and talking into the speakerphone.

In some cases, however, it may be desirable to allow a group of people to engage in a conference via a common telephone without using speakerphone functionality. For instance, the telephone may not have speakerphone functionality, or the telephone might have speakerphone functionality but for one reason or another it may be desirable to conduct the conference without using the speakerphone functionality.

One way to conduct such a conference is to equip each participant with a personal headset or other conferencing device that communicates over a short range wireless connection with the telephone or other base unit. Each conferencing device would include a microphone and speaker and would communicate over a unique, respective wireless channel with the base unit. Thus, the base unit may receive identifiable audio or video from the various local conference participants and may combine and distribute the audio or video to each other local conference participant and to a remote party on the call. Further, the base unit may receive audio or video from the remote call party and may similarly distribute the audio or video to the various local conference participants. In this manner, all of the local conference participants can fully participate in the call with each other and with the remote call party via the base unit.

A problem with this conceptual arrangement can arise, however, in a scenario where the base unit is arranged to support only a limited number of short range wireless connections at a time. For instance, if the base unit is equipped with a Bluetooth transceiver, the Bluetooth transceiver may be of the type that is able to connect with only a limited number of other Bluetooth-equipped devices at a time, and thus the base unit may be unable to engage in Bluetooth communication concurrently with a larger number of Bluetooth-equipped headsets or other conference devices.

SUMMARY

The present invention provides a mechanism for allowing a group of people to engage in a conference (e.g., audio or video conference) through respective short-range wireless connections with a common telephone or other base unit that connects with a remote call party. According to the invention, each person will operate a respective headset or other conference device that includes a microphone, a speaker, a short-range wireless transceiver, such as a Bluetooth transceiver, and an optional display screen. Further, the base unit will include functionality to communicate with a remote call party and will further include a corresponding short-range wireless transceiver for communicating with the various conference devices. However, the base unit will be arranged to connect with just a limited number of the conference devices at a time.

To facilitate conferencing in this arrangement, the base unit will apply a floor control process based on short-range wireless connections with the conference devices during a call. In particular, the base unit will allow a predetermined number of the conference devices to have the floor at any given time, by dynamically connecting with at most the predetermined number of conference devices at a time. When given conference devices are connected with the base unit, those conference devices will be considered to hold the floor and will be able to convey audio (e.g., speech), video, or other conference bearer data to the base unit through their respective connection with the base unit. During that time, other conference devices will not be connected with the base unit and will thus be unable to convey audio, video, or other conference bearer data to the base unit.

In practice, when the floor is not fully occupied (i.e., the predetermined number has not been reached), any one of the conference devices may acquire the floor, so that the conference device can then convey conference bearer data to the base unit. To acquire the floor, the conference device may send a connection-request over an air interface control channel to the base unit, seeking to connect with the base unit, i.e., to establish a physical bearer connection with the base unit. The conference device may send such a connection request in response to a request by a user of the conference device. For instance, the conference device may include a multi-functional button that the user may engage to request the floor, and the conference device may send the connection request when the user engages the button. Alternatively, the conference device may send such a connection request upon detecting speech from the user (in which case, the conference device will also preferably buffer the user's speech so as to be able to send the speech in full to the base unit upon successful connection).

When the base unit receives a connection request from one of the conference devices, the base unit will determine whether the base unit is already connected with the predetermined number of other conference devices. If the base unit determines that it is not already connected with the predetermined number of other conference devices, then the base unit will grant the connection request and become connected with the requesting conference device, thereby granting the floor to the conference device. Further, the conference device may alert its user (e.g., with an audible tone) that the conference device now has the floor. On the other hand, if the base unit is already connected with the predetermined number of other conference devices, then the base unit will deny the connection request and will thus not become connected with the requesting conference device, thereby denying the floor. Alternatively, the base unit could apply priority logic that causes the base unit to drop the floor from a lower priority conference device when a higher priority conference device seeks to acquire the floor.

This connection-based floor control process will thus enable the base unit to control which conference units hold the floor throughout a call and thus which local conference participants can convey audio, video, or other conference bearer data into the call.

To provide robust conference functionality, a mechanism may also be provided to allow all of the conference participants to receive conference audio, video, or other conference bearer data from the base unit. That is, when a given conference device does not hold the floor, the conference device should be able to receive any conference bearer data provided by any conference participant that holds the floor and any conference bearer data provided by the remote call party.

To accomplish this in practice, the base unit may be equipped with a wireless broadcast transmitter to generally broadcast the conference bearer data over a short range wireless connection to each of the conference devices, and each of the conference devices may be equipped with a corresponding wireless broadcast receiver to receive the conference bearer data. In a preferred example, the base unit may include a simple FM transmitter of the type that is commonly used today to send portable audio signals to a local FM receiver, and each conference device may thus include a simple FM receiver to receive the conference bearer data.

Thus, in operation during a call, as the base unit receives audio, video, or other conference bearer data from any of the conference devices and/or from the remote call party, the base unit will transmit that conference bearer data via its broadcast transmitter to the conference devices, and the conference devices will receive and present the conference bearer data to the conference participants. At the same time, the base unit will apply the connection-based floor control process to dynamically connect with at most a predetermined number of conference devices at a time and thereby receive conference bearer data from at most the predetermined number of conference devices at a time.

DETAILED DESCRIPTION

Figure 1:
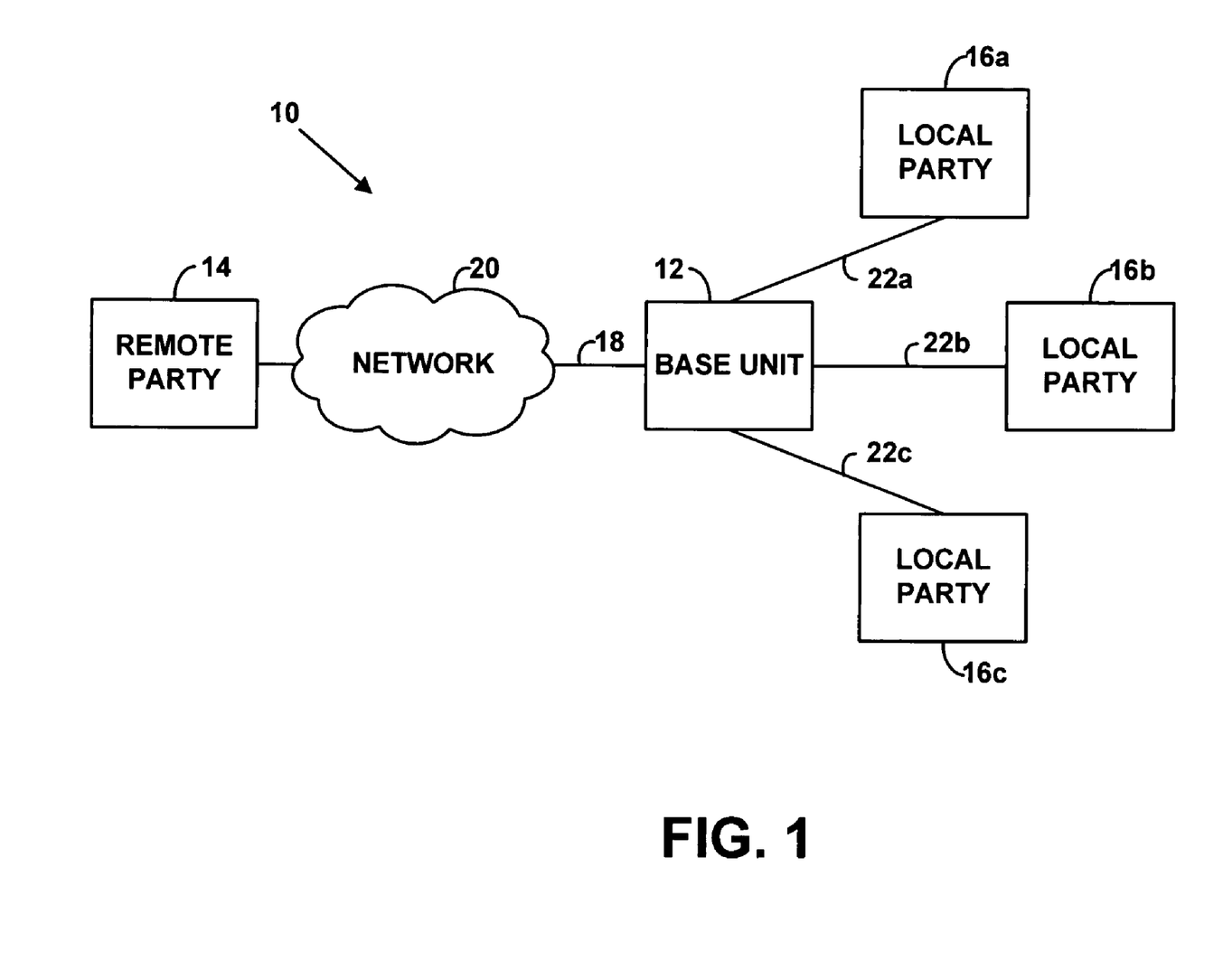
FIG. 1 is a simplified block diagram of a telecommunications system, according to an example of the present invention.

Referring to the drawings, FIG. 1 is a simplified block diagram of a telecommunications system 10, according to an example of the present invention. As shown, the system 10 includes at its core a base unit 12, which may function to communicatively connect a remote party 14 with a plurality of local parties 16.

It should be understood, however, that this and other arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic. For instance, various functions may be carried out by a processor executing a set of machine language instructions stored in memory. Provided with the present disclosure, those skilled in the art can readily prepare appropriate computer instructions to perform such functions.

The base unit 12 may be any telecommunication device that facilitates conference communication (e.g., audio or video conferencing) between the remote party 14 and the plurality of local parties 16. More particularly, the base unit may function to (i) engage in concurrent communication with the remote party 14 and at least one of the plurality of local parties 16 (e.g., local party 16a) and (ii) broadcast conference bearer data, which the local parties 16 may then receive if desired. The base unit 12 may communicate with the remote party 14, communicate with local parties 16, and broadcast conference bearer data according to the same protocol, or various different protocols. For example, base unit 12 may be a wireless telephone that communicates with the remote party 14 according to a cellular protocol, communicates with local parties 16 according to a Bluetooth protocol, and broadcasts conference bearer data according to a Frequency Modulated (FM) protocol. Alternatively, the base unit 12 may be a wireless access point (e.g., a wireless router) that communicates with the remote party 14 according to an Ethernet protocol, communicates with the local parties 16 according to a Wi-Fi protocol, and broadcasts conference bearer data according to a Wi-Fi protocol. Other examples are possible as well.

The remote party 14 may be any telecommunication entity that engages in communication (e.g., audio communication or video communication) with the base unit 12, such as a circuit-switched landline telephone, a wireless telephone, a packet-switched (e.g., Voice over Internet Protocol (VoIP)) telephone, and/or a server (e.g., conference server, media server, etc.) for instance. The remote party 14 may communicatively couple to the base unit 12 via link 18 and network 20, both of which may vary depending on the structure of the base unit 12 and the remote party 14.

For example, if either the base unit 12 or the remote party 14 is a circuit-switched landline device, network 20 may include a local telephone loop, one or more telephony switches (e.g., service switching points (SSPs)), and a public switched telephone network (PSTN). Alternatively or additionally, if either the base unit 12 or the remote party 14 is a wireless device, network 20 may include one or more radio access networks (RANs), each of which may include a base transceiver station (BTS), a base station controller (BSC), and a mobile switching center (MSC). Additionally yet, if either the base unit 12 or the remote party 14 is a packet-switched device (e.g., VoIP telephone, conference server, etc.), network 20 may include a packet network and entities that facilitate communication with the packet network (e.g., a packet data serving node (PDSN), a media gateway, a media terminal adaptor, etc.). In turn, link 18 may be a wired link (e.g., twisted-pair cable) or a wireless air interface link that carries communications between the network 20 and the base unit 12 according to a variety of wireless protocols. For example, without limitation, link 18 may carry communications compliant with cellular protocols (e.g., Code Division Multiple Access (CDMA), Time Division Multiple Access (TDMA), Global System for Mobile Communication (GSM)), Wi-Fi protocols (e.g., 802.11x), and/or Bluetooth protocols.

Each of the local parties 16 may be a telecommunication device that functions to (i) communicate with the base unit 12 and (ii) receive conference bearer data over a broadcast channel. For example, the local parties 16 may be headsets, handsets, or other conferencing devices that may engage in audio or video communications with the base unit 12 and receive broadcast audio or video from the base unit 12. The local parties 16 may communicatively couple to the base unit 12 via the links 22. As such, the local parties 16 may communicate (i.e., send and receive conference bearer data over a dedicated channel) with the base unit 12 and receive broadcast conference bearer data from the base unit 12 over links 22, each which may be a wired link (e.g., twisted-pair cable) or a wireless air interface link that carries communications between the local parties 16 and the base unit 12 according to any of a variety of protocols. For example, without limitation, the wireless links 22 may carry communications compliant with cellular protocols (e.g., CDMA, TDMA, GSM), Wi-Fi protocols (e.g., 802.11x), Bluetooth protocols, Infrared protocols, FM protocols (e.g., Family Radio Service (FRS)), and/or Amplitude Modulated (AM) protocols. In a preferred example, the links 22 will carry short-range wireless communications. The local parties 16 may also receive broadcast conference bearer data from other parties via other links (not shown).

Figure 2:
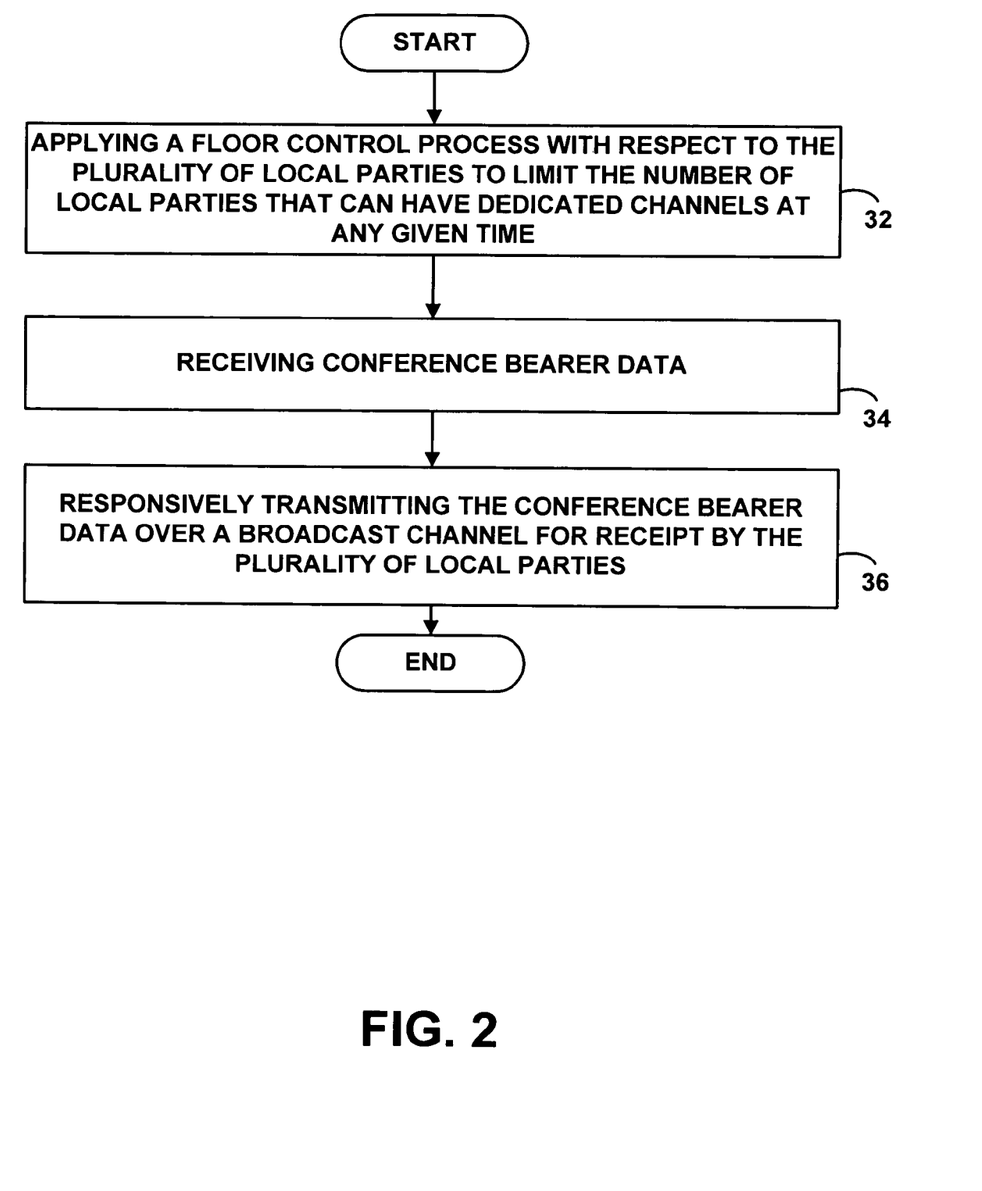
FIG. 2 is a flow chart depicting a method of setting up in a base unit a conference communication between a remote party and a plurality of local parties in the system of FIG. 1, according to an example of the present invention.

FIG. 2 is a flow chart depicting a method of setting up in the base unit 12 a conference communication (e.g., audio or video conference) between the remote party 14 and the plurality of local parties 16 in the system 10, according to an example of the present invention. FIG. 2 assumes that the base unit 12 is operable to engage in (i) remote communications (e.g., a cellular wireless telephone call) with the remote party 14 over link 18 and network 20 and (ii) local communications with the plurality of local parties 16 over dedicated channels on links 22.

At step 32, the base unit 12 applies a floor control process with respect to the local parties 16 to limit the number local parties 16 that can have dedicated channels with the base unit 12 at any given time. During that floor control process, the base unit 12 may first receive from one of the local parties 16, such as local party 16a, a request for a new dedicated channel to transmit conference bearer data related to the communication with the remote party 14. For example, if the local party 16a is a Bluetooth device such as a Bluetooth headset, the base unit 12 may receive from the Bluetooth device a connection request for a new dedicated Bluetooth channel on link 22a, over which the Bluetooth device may then transmit conference bearer data. The base unit 12 may receive the request over a control channel reserved for communication requests, or a temporary dedicated channel. Further, the local party 16a may send the request in response to various triggering events. For example, the local party 16a may send the request in response to detecting a request from a user. Alternatively, the local party 16a may send the request in response to detecting speech from a user, in which case the local party 16a may also buffer a user's speech until receiving a notification from the base unit 12 indicating that the new dedicated channel is established.

After receiving the request for a new dedicated channel, the base unit's floor control process may further include establishing the new dedicated channel with the local party 16a only if a present number of local parties 16 having dedicated channels is less than a predetermined threshold. For example, if the predetermined threshold is one, the base unit 12 will deny the local party's request if any of the other local parties 16 (e.g., local party 16b or local party 16c) presently has a dedicated channel with the base unit 12 for transmitting conference bearer data. Alternatively, if the predetermined threshold is greater than one, the base unit 12 may establish multiple concurrent dedicated channels with local parties 16, and thus may engage in concurrent communications with multiple local parties 16. When establishing a dedicated channel with the local party 16a, the base unit 12 may also carry out various setup functions, such as role switching, authentication, and/or encryption.

The base unit's floor control process may also include transmitting information about a broadcast channel to the local party 16a in response to receiving the request for the new channel from the local party 16a, regardless of whether the base unit 12 establishes the new dedicated channel with the local party 16a. For example, the base unit 12 may establish a temporary dedicated channel with the local party 16a, transmit the broadcast channel information over that temporary dedicated channel to the local party 16a, and then release the temporary dedicated channel with the local party 16a. Alternatively, the base unit 12 may transmit the broadcast channel information over a control channel that is reserved for the transmission of control signaling. In either case, the local party 16a may then use the broadcast channel information to receive conference bearer data from the base unit 12 over the broadcast channel, as described in more detail below.

The base unit's floor control process may further include sending a notification (e.g., an audio tone or visual indicator) to the local party 16a via link 22a indicating whether the new dedicated channel is established. Further, if the base unit 12 does establish the dedicated channel with the local party 16a, the base unit's floor control process may include releasing the dedicated channel with the local party 16a in response to various triggering events (e.g., the local party 16a has not sent conference bearer data over the dedicated channel for a predetermined time period or a higher priority local party requests a new dedicated channel). However, before applying the floor control process, the base unit 12 may establish permanent dedicated channels with a predetermined group of local parties 16, such that those predetermined local parties 16 remain "active" throughout the conference communication. The base unit 12 may determine which local parties 16 receive permanent dedicated channels based on user input, the priority of the local parties 16, and/or some other criteria.

At step 34, the base unit 12 may then receive conference bearer data (e.g., audio communication or video communication). For example, the base unit 12 may receive the conference bearer data from the remote party 14. Alternatively, if one of the local parties 16, such as the local party 16a, has an established dedicated channel with the base unit 12, the base unit 12 may receive the conference bearer data from the local party 16a over the established dedicated channel on link 22a.

At step 36, in response to receiving the conference bearer data, the base unit 12 will then transmit the conference bearer data over a broadcast channel for receipt by the local parties 16. As such, any local party 16 of the system 10 may receive conference bearer data from the remote party 14 or an "active" local party 16 (i.e., a local party with an established dedicated channel) via the base unit 12, regardless of whether the local parties 16 are "actively" participating in the communication over established dedicated channels. For example, the base unit 12 may broadcast the conference bearer data over an unsecured FM channel, and any local party 16 may then receive the conference bearer data over the FM channel.

However, before receiving the conference bearer data from the base unit 12 over the broadcast channel, the local parties 16 may need to obtain information about the base unit's broadcast channel. For example, if the base unit's broadcast channel is an FM channel, the local parties 16 may need to obtain the frequency of the FM channel before they can receive conference bearer data over the FM channel. Thus, as discussed above, the local parties 16 may obtain the information about the base unit's broadcast channel by receiving the information from the base unit 12 in response to requesting a new dedicated channel from the base unit 12. Alternatively or additionally, the local parties 16 may obtain the information about the base unit's broadcast channel from other sources.

In response to receiving the conference bearer data, the base unit 12 may additionally transmit the conference bearer data to (i) the remote party 14 and (ii) any "active" local parties 16 over established dedicated channels. In a preferred example, the base unit 12 will transmit to the remote party 14 any conference bearer data received from the local parties 16. Further, the base unit 12 may only transmit conference bearer data to the "active" local parties 16 over dedicated channels if the base unit 12 received the conference bearer data from particular parties (e.g., the remote party 14 or certain other local parties 16). Alternatively, the base unit 12 may not transmit any conference bearer data to the "active" local parties 16 over dedicated channels, and instead the base unit 12 may transmit all conference bearer data for receipt by the local parties 16 over the broadcast channel only.

Figure 3:
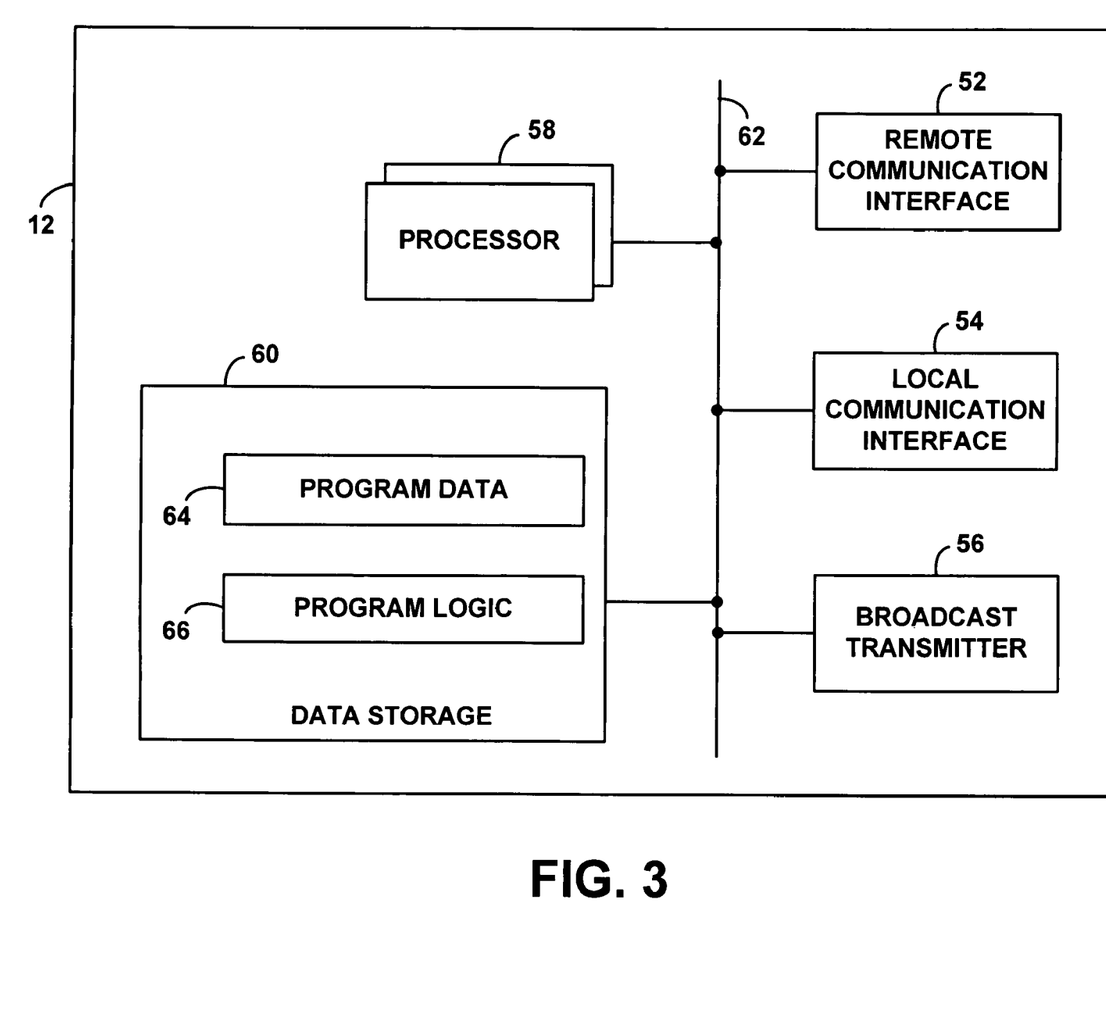
FIG. 3 is a simplified block diagram of a base unit in the system of FIG. 1, according to an example of the present invention.

The functionality of the present invention may be implemented in one or more entities of the system 10. For example, as discussed above, the base unit 12 may carry out functions of the present invention. Accordingly, FIG. 3 is a simplified block diagram of the base unit 12 of FIG. 1, showing functional components that can operate to carry out aspects of the present invention. As shown in FIG. 3, the exemplary base unit 12 includes, without limitation, a remote communication interface 52, a local communication interface 54, a broadcast transmitter 56, a processor 58, and data storage 60, all interconnected by a system bus or other connection mechanism 62. The exemplary base unit 12 may also include other components, such as a user interface (not shown).

The remote communication interface 52 preferably functions to communicatively couple the base unit 12 to remote parties, such as the remote party 14, via link 18 and network 20. As such, the remote communication interface 52 may take the form of an Ethernet network interface card, a chipset and antenna adapted to facilitate wireless communication according a desired protocol (e.g., a cellular protocol, Wi-Fi, Bluetooth, etc.), and/or any other form that provides for wireless and/or wired communication with the remote party 14 via link 18 and network 20. The base unit 12 may also include multiple remote communication interfaces 52, such as one through which the base unit 12 sends communication to the remote party 14, and one through which the base unit 12 receives communication from the remote party 14.

The local communication interface 54 preferably functions to communicatively couple the base unit 12 to the local parties 16 via the links 22. As such, similar to the remote communication interface 52, the local communication interface 54 may take the form of an Ethernet network interface card, a chipset and antenna adapted to facilitate wireless communication according a desired protocol (e.g., Bluetooth, Wi-Fi, Infrared, FM (e.g., FRS), AM, etc.), and/or any other form that provides for wireless and/or wired communication with the local parties 16 via links 22. In a preferred example, the local communication interface 54 may be a chipset and antenna adapted to facilitate short-range wireless communication with the local parties 16. The base unit 12 may also include multiple local communication interfaces 54, such as one through which the base unit 12 sends communication to the local parties 16, and one through which the base unit 12 receives communication from the local parties 16.

The broadcast transmitter 56 preferably functions to transmit conference bearer data over a broadcast channel, which the local parties 16 may then receive if desired. As such, the broadcast transmitter 56 may take the form of an Ethernet network interface card, a chipset and antenna adapted to wirelessly transmit conference bearer data according a desired protocol (e.g., FM (e.g., FRS), AM, Bluetooth, Wi-Fi, etc.), and/or any other form that provides for wireless and/or wired transmission of conference bearer data over a broadcast channel. In a preferred example, the broadcast transmitter 56 may be a chipset and antenna adapted to wirelessly transmit conference bearer data over a short distance for receipt by the local parties 16. The remote communication interface 52, the local communication interface 54, and the broadcast transmitter 56 may be integrated in whole or in part, such as in the form of an integrated chipset and/or sharing one or more antennas.

The processor 58 may comprise one or more general purpose microprocessors and/or dedicated signal processors. (The term "processor" encompasses either a single processor or multiple processors that could work in combination.) Data storage 60, in turn, may comprise memory and/or other storage components, such as optical, magnetic, organic or other memory or disc storage, which can be integrated in whole or in part with the processor 58. Data storage 60 preferably contains or is arranged to contain (i) program data 64 and (ii) program logic 66. Although these components are described herein as separate data storage elements, the elements could just as well be physically integrated together or distributed in various other ways. In a preferred example, the program data 64 would be maintained in data storage 60 separate from the program logic 66, for easy updating and reference by the program logic 66.

Program data 64 may contain information relating to the base unit 12. For example, program data 64 may contain one or more identifiers of the base unit 12 (e.g., Mobile Identification Number (MIN), Internet Protocol (IP) address, Bluetooth Device Address, etc.), which may depend on the communication interfaces (e.g., remote communication interface 52, local communication interface 54, and broadcast transmitter 56) of the base unit 12. As another example, program data 64 may contain an indication of various characteristics of each communication interface of the base unit 12, such as a type of each communication interface (e.g., Ethernet card, Bluetooth chipset/antenna, FM broadcast transmitter, etc.), an identifier of each communication interface (e.g., MIN, IP address, Bluetooth Device Address, FM broadcast frequency, etc.), and/or other information that is specific to communication with the particular communication interface (e.g., Bluetooth Service Profiles). As yet another example, program data 64 may contain a predetermined threshold that represents a maximum number of dedicated channels that the base unit 12 may concurrently maintain with local devices 16 via the local communication interface 54. The predetermined threshold preferably depends on characteristics of the local communication interface 54, but may also depend on other characteristics of the base unit 12 and/or input preferences of a user of the base unit 12.

Program data 64 may also contain information relating to the remote party 14 of the system 10. For example, once the base unit 12 establishes the communication with the remote party 14, program data 64 may temporarily contain, for example, an identifier of the remote party 14 (e.g., MIN, IP address, etc.), an indication of a type of the remote party 14 (e.g., cellular telephone, conference server, router, etc.), and/or other available information relating to the remote party 14 or a user thereof.

Program data 64 may further contain information relating to the local parties 16 of the system 10. As an example, for each of the local parties 16 in the system 10, program data 64 may contain an identifier of the local party 16 (e.g., Bluetooth Device Address, IP address, etc.), an indication of a type of the local party 16 (e.g., Bluetooth headset, Wi-Fi telephone, etc.), a priority of the local party 16, and/or security information for the local party 16 (e.g., Bluetooth link key, Wired Equivalency Privacy (WEP) key, etc.). Additionally, for each of the local parties 16 having an established dedicated channel with the base unit 12, program data 64 may temporarily contain, for example, an identifier of the local party's dedicated channel and/or other information that is specific to communication with the particular type of the local party 16 (e.g., Bluetooth Service Profiles).

Program data 64 may additionally contain information associated with a conference communication between the remote party 14 and the local parties 16. For example, program data 64 may temporarily contain conference bearer data received from the remote party 14 (via the remote communication interface 52) or the local parties 16 (via the local communication interface 54). Similarly, program data 64 may temporarily contain conference bearer data before transmission to the remote party 14 (via the remote communication interface 52) or the local parties 16 (via the local communication interface 54 or the broadcast transmitter 56). Program data 64 may contain other information associated with the conference communication as well.

Program logic 66 preferably comprises machine language instructions that are executed or interpreted by processor 58 to carry out functions according to examples of the present invention. It should be understood, however, that the program logic 66 and its associated functions are described herein by way of example only. As such, those skilled in the art will appreciate that other program logic and/or functions may be used instead, some program logic and/or functions may be added, and some program logic and/or functions may be omitted altogether. Further, the various functions described herein can be embodied in software, hardware, and/or firmware.

For example, program logic 66 may be executable by the processor 58 to establish a communication with the remote party 14 via the remote communication interface 52 and a dedicated channel on link 18 and network 20. For example, if the remote party 14 requests a communication with the base unit 12 (e.g., by placing a telephone call to the base unit 12), the program logic 66 may cause the base unit 12 to accept the communication request (e.g., by answering the call) and establish a dedicated channel with the remote party 14. Alternatively, if a user of the base unit 12 or one of the local parties 16 directs the base unit 12 to establish a communication with the remote party 14, the program logic 66 may cause the base unit 12 to request a communication with the remote party 14 (e.g., by placing a telephone call to the remote party 14) and then establish the communication over a dedicated channel if the remote party 14 accepts the request (e.g., by answering the call).

As another example, program logic 66 may be executable by the processor 58 to apply a floor control with respect to the local parties 16 to limit the number of local parties that can have dedicated channels at any given time. As such, program logic 66 may be executable by the processor 58 to first receive from one of the local parties 16, such as local party 16*a*, a request for a new dedicated channel to transmit conference bearer data. The base unit 12 may receive the request via the local communication interface 54 and a temporary dedicated channel on link 22*a*. Alternatively, the base unit 12 may receive the request via the local communication interface 54 and a control channel on link 22*a* that is reserved for local channel requests.

In response to receiving the request from one of the local parties 16, such as local party 16*a*, the program logic 66 may be executable by the processor 58 to apply the floor control process by establishing the new dedicated channel with the local party 16*a* only if a present number of established dedicated channels with local parties is less than a predetermined threshold. For example, if the predetermined threshold is one, the program logic 66 may cause the base unit 12 to deny the local party's request if any other local party (e.g., local party 16*b* or local party 16*c*) is currently participating in the communication with the remote party 14 via a dedicated channel with the base unit 12. In carrying out this function, the program logic 66 may cause the base unit 12 to (i) determine the present number of established dedicated channels with local parties 16 (e.g., by referring to program data 64) and (ii) compare the present number of established dedicated channels with local parties 16 to the predetermined threshold, which may be stored in program data 64. Further, the program logic may also cause the base unit 12 to carry out various setup functions when establishing the dedicated channel, such as role switching, authentication, and/or encryption.

In response to receiving the request from one of the local parties 16, such as local party 16*a*, the program logic 66 may also be executable by the processor 58 to apply the floor control process by transmitting information about the base unit's broadcast channel to the local party 16*a*, regardless of whether the base unit 12 establishes the new dedicated channel with the local party 16*a*. Preferably, the information about the broadcast channel will be stored as program data 64 in data storage 60, and the program logic 66 will obtain the broadcast channel information from data storage 60 before transmitting the information to the local party 16*a*. The base unit 12 may transmit the broadcast channel information via the local communication interface 54 and a temporary dedicated channel on link 22*a*, or the base unit 12 may transmit the broadcast channel information via the local communication interface 54 and a control channel on link 22*a* that is reserved for the transmission of broadcast channel information.

After the base unit 12 determines whether to establish the new dedicated channel with one of the local parties 16, such as local party 16*a*, the program logic 66 may be executable by the processor 58 to apply the floor control process by sending a notification to the local party 16*a* indicating whether the new dedicated channel is established. For example, the program logic 66 may cause the base unit 12 to send the local party 16*a*, via the local communication interface 54 and a dedicated or control channel on link 22*a*, an audible tone indicating that the new dedicated channel is established. Alternatively, the program logic 66 may cause the base unit 12 to send the local party 16*a*, via the local communication interface 54 and a dedicated or control channel over link 22*a*, an audible tone indicating that the new dedicated channel was not established. In either case, the base unit 12 may send the notification along with the broadcast channel information, or the base unit may send the notification separately from the broadcast channel information.

Once the base unit 12 establishes a dedicated channel with one of the local parties 16, such as local party 16*a*, the program logic 66 may also be executable by the processor 58 to apply the floor control process by releasing the dedicated channel with the local party 16*a* in response to various triggering events. For example, the program logic 66 may cause the base unit 12 to release an established dedicated channel with the local party 16*a* in response to detecting that the local party 16*a* has not sent conference bearer data over the dedicated channel for a predetermined time period. Alternatively, the program logic 66 may cause the base unit 12 to release an established dedicated channel with the local party 16*a* in response to receiving a request for a new dedicated channel from one of the other local parties 16, such as local party 16b, which has a higher priority than the local party 16a. However, for a predetermined group of local parties 16, the base unit 12 may establish permanent dedicated channels, such that those predetermined local parties 16 remain "active" throughout the conference communication. The base unit 12 may determine which local parties 16 receive permanent dedicated channels based on user input, the priority of the local parties 16 (which may be stored in program data 64), and/or some other criteria.

As yet another example, program logic 66 may be executable by the processor 58 to receive conference bearer data (e.g., audio communication or video communication). For example, the program logic 66 may cause the base unit 12 to receive the conference bearer data from the remote party 14 via the remote communication interface 52 and a dedicated channel on link 18 and network 20. Alternatively, if one of the local parties 16, such as the local party 16a, has an established dedicated channel with the base unit 12, the program logic 66 may cause the base unit 12 to receive the conference bearer data from that "active" local party 16a via the local communication interface 54 and the established dedicated channel on link 22a. In either case, the program logic 66 may temporarily store the received conference bearer data in data storage 60 as program data 64.

In response to receiving the conference bearer data, the program logic 66 will then be executable by the processor 58 to transmit the conference bearer data, via the broadcast transmitter 56, over the broadcast channel for receipt by the local parties 16. Additionally, in response to receiving the conference bearer data, the program logic 66 may be executable by the processor 58 to transmit the conference bearer data to (i) the remote party 14 via the remote communication interface 52 and (ii) any "active" local parties 16 over established dedicated channels via the local communication interface 54. In a preferred example, the base unit 12 will transmit to the remote party 14 any conference bearer data received from the local parties 16. Further, the base unit 12 may only transmit conference bearer data to the "active" local parties 16 over dedicated channels if the base unit 12 received the conference bearer data from particular parties (e.g., the remote party 14 or certain other local parties 16). Alternatively, the base unit 12 may not transmit any conference bearer data to the "active" local parties 16 over dedicated channels, and instead the base unit 12 may transmit all conference bearer data for receipt by the local parties 16 over the broadcast channel only via the broadcast transmitter 56. In any case, to carry out the transmission functions described above, the program logic 66 may also be executable by the processor 58 to convert received conference bearer data between various protocols (e.g., from a cellular protocol to a Bluetooth protocol and an FM protocol).

Figure 4:
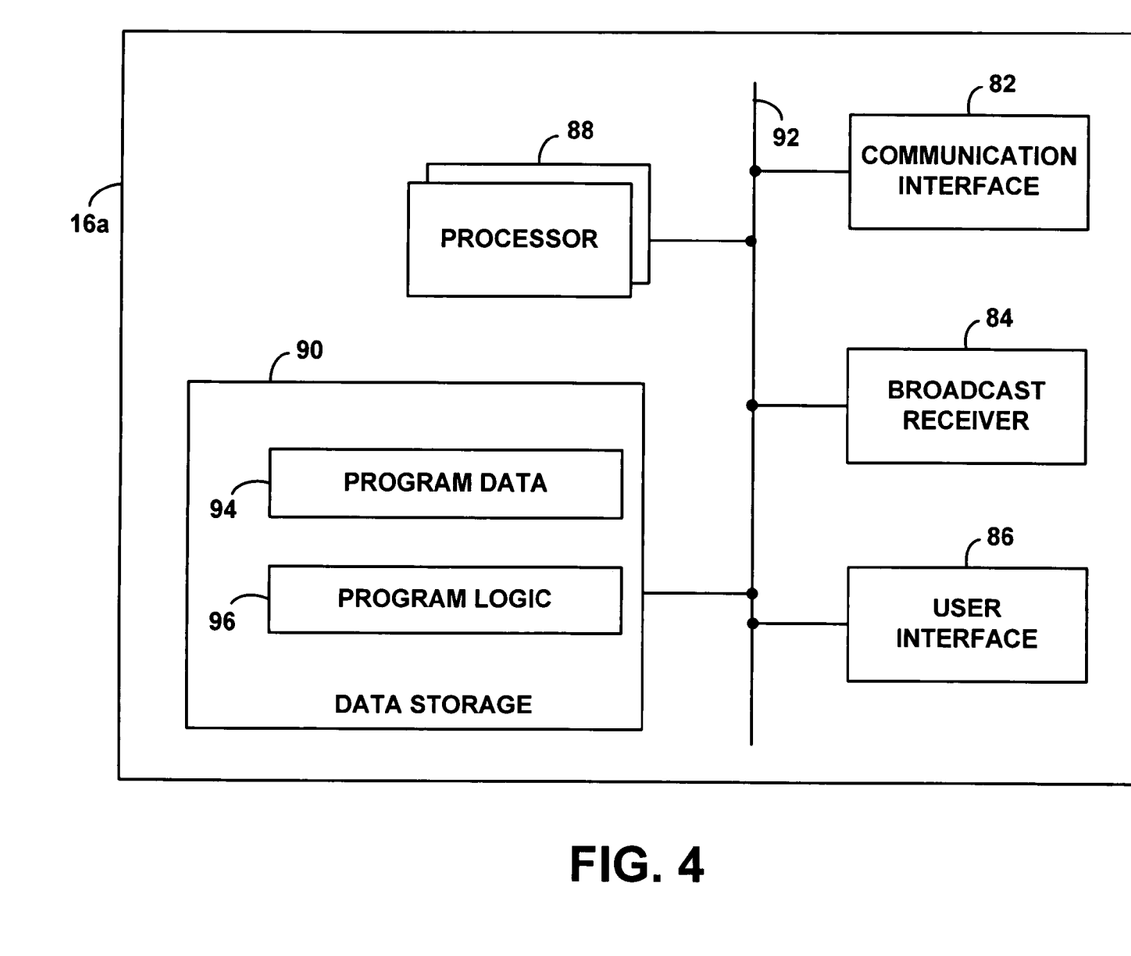
FIG. 4 is a simplified block diagram of a local party in the system of FIG. 1, according to an example of the present invention.

FIG. 4 is a simplified block diagram of one of the plurality of local parties 16 of system 10, according to an example of the present invention. As shown in FIG. 4, the exemplary local party 16a includes, without limitation, a communication interface 82, a broadcast receiver 84, a user interface 86, a processor 88, and data storage 90, all interconnected by a system bus or other connection mechanism 92.

The communication interface 82 preferably functions to communicatively couple the local party 16a to the base unit 12 via link 22a. As such, the communication interface 82 may take the form of an Ethernet network interface card, a chipset and antenna adapted to facilitate wireless communication according a desired protocol (e.g., Bluetooth, Wi-Fi, Infrared, FM (e.g., FRS), AM, etc.), and/or any other form that provides for wireless and/or wired communication with the base unit 12 via link 22a. In a preferred example, the communication interface 82 may be a chipset and antenna adapted to facilitate short-range wireless communication with the base unit. The local party 16a may also include multiple communication interfaces 82, such as one through which the local party 16a sends communication to the base unit 12, and one through which the local party receives communication from the base unit 12.

The broadcast receiver 84 preferably functions to receive conference bearer data over a broadcast channel, such as conference bearer data sent over the base unit's broadcast channel. As such, the broadcast receiver 84 may take the form of an Ethernet network interface card, a chipset and antenna adapted to wirelessly receive conference bearer data compliant with a desired protocol (e.g., FM (e.g., FRS), AM, Bluetooth, Wi-Fi, etc.), and/or any other form that provides for wireless and/or wired receipt of conference bearer data over a broadcast channel. The communication interface 82 and the broadcast receiver 84 may be integrated in whole or in part, such as in the form of an integrated chipset and/or sharing one or more antennas.

The user interface 86 preferably functions to facilitate user interaction with the local party 16a. For example, the user interface 86 may include input components, such as a microphone for receiving analog audio signals from a user and a multi-functional button and/or keyboard for facilitating tactile user input. Additionally, the user interface 86 may include output components, such as a speaker for playing out audio signals to a user and/or a display screen for displaying video signals to the user. Additionally yet, the user interface 86 may include analog-to-digital conversion circuitry for converting between analog signals and digital signals.

The processor 88 may comprise one or more general purpose microprocessors and/or dedicated signal processors. (The term "processor" here as well encompasses either a single processor or multiple processors that could work in combination.) Data storage 90, in turn, may comprise memory and/or other storage components, such as optical, magnetic, organic or other memory or disc storage, which can be integrated in whole or in part with the processor 88. Data storage 90 preferably contains or is arranged to contain (i) program data 94 and (ii) program logic 96. Although these components are described herein as separate data storage elements, the elements could just as well be physically integrated together or distributed in various other ways. In a preferred example, the program data 94 would be maintained in data storage 90 separate from the program logic 96, for easy updating and reference by the program logic 96.

Program data 90 may contain information relating to the local party 16a, such as an identifier of the local party 16a (e.g., Bluetooth Device Address, IP address, etc.), an indication of a type of the local party 16a (e.g., Bluetooth headset, Wi-Fi telephone, etc.), and/or other information that is specific to the particular type of the local party 16a (e.g., Bluetooth Service Profiles). Further, program data 90 may contain information relating to other parties in the system 10 (e.g., base unit 12), such as identifiers of the other parties and relevant information relating to communications with the other parties (e.g., broadcast channel information, security permissions, etc.). Further yet, program data 90 may contain information associated with a communication between a user of the local party 16a and another party of the system 10, such as temporarily buffered audio or video captured from the user or temporarily stored conference bearer data received from another party.

Program logic 96 preferably comprises machine language instructions that are executed or interpreted by processor 88 to carry out functions according to examples of the present invention. It should be understood, however, that the program logic 96 and its associated functions are described herein by way of example only. As such, those skilled in the art will appreciate that other program logic and/or functions may be used instead, some program logic and/or functions may be added, and some program logic and/or functions may be omitted altogether. Further, the various functions described herein can be embodied in software, hardware, and/or firmware.

For example, program logic 96 may be executable by the processor 88 to generate and send to the base unit 12, via the communication interface 82, a request for a new dedicated channel to transmit conference bearer data. The program logic 96 may cause the local party 16a to generate and send the request in response to various triggering events. For example, the program logic may cause the local party 16a to generate and send the request in response to detecting a request from a user via the user interface 96 (e.g., the multifunctional button). Alternatively, the program logic may cause the local party 16a to generate and send the request in response to detecting speech from a user via the user interface 96 (e.g., the microphone). As such, the program logic 96 may also be executable by the processor 88 to (i) detect speech from a user and (ii) buffer the user's speech so as to send the speech in full to the base unit 12 once a dedicated channel is established.

As another example, Program logic 96 may be executable by the processor 88 to obtain information about the base unit's broadcast channel (e.g., frequency of the broadcast channel). In a preferred example, the program logic 96 may obtain information about the base unit's broadcast channel by receiving the information from the base unit 12 via the communication interface 82 in response to requesting a new dedicated channel from the base unit 12. Alternatively or additionally, the program logic 96 may obtain the information about the base unit's broadcast channel from other sources.

As yet another example, program logic 96 may be executable by the processor 88 to send and receive conference bearer data between a user and the base unit 12 via the communication interface 82 and a dedicated channel on link 22a. For example, the program logic 96 may cause the local party 16a, such as a Bluetooth headset, to send and receive conference audio or video between a user and the base unit 12 over a Bluetooth channel. When sending the conference bearer data from the user to the base unit 12, the program logic 96 may (i) receive the conference bearer data from the user via the user interface 86, (ii) temporarily store the conference bearer data in data storage 90 as program data 94, (iii) convert the conference bearer data to a format for transmission to the base unit 12 (e.g., from analog to a Bluetooth format). Similarly, when receiving the conference bearer data from the base unit 12 over a dedicated channel, the program logic 96 may also (i) temporarily store the received conference data in data storage 90 as program data 94, (ii) convert the received conference data into a format for playout to the user (e.g., from a Bluetooth format to analog audio), and (iii) play out the conference bearer data to the user via the user interface 86.

As a further example, program logic 96 may be executable by the processor 88 to receive conference bearer data over a broadcast channel via the broadcast receiver 84. For example, the program logic 96 may cause the local party 16a to receive, via the broadcast receiver 84, conference audio or video from the base unit 12 over an FM broadcast channel on link 22a. When receiving the conference bearer data over a broadcast channel, such as the base unit's broadcast channel, the program logic 96 may also (i) temporarily store the received conference data in data storage 90 as program data 94, (ii) convert the received conference data into a format for playout to the user (e.g., from an FM format to analog audio), and then (iii) play out the conference bearer data to the user via the user interface 86.

Figure 5:
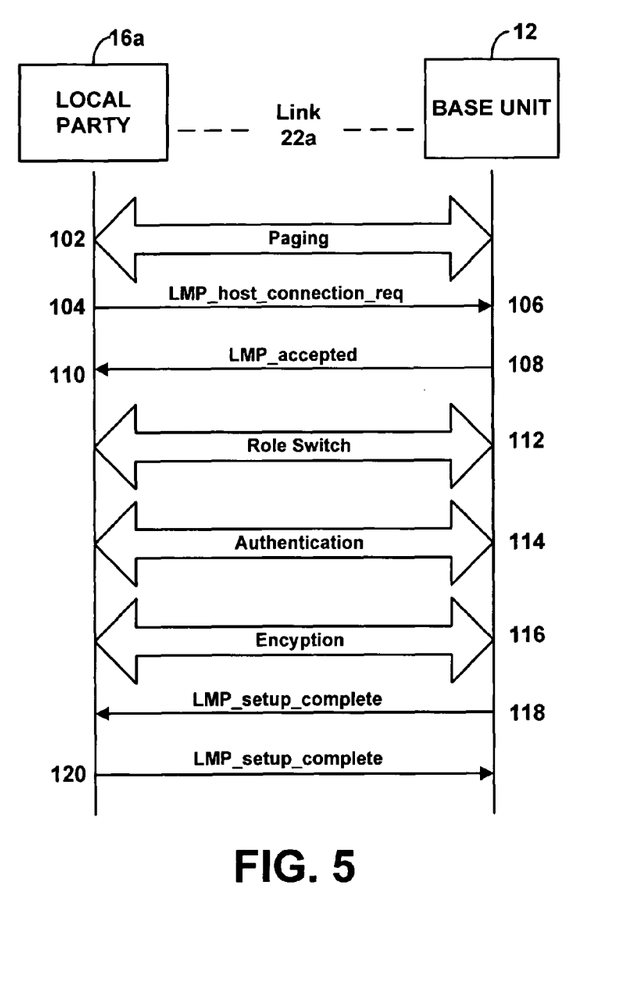
FIG. 5 illustrates a message flow diagram for establishing a dedicated channel between the base unit and the local device over link in the system, according to an example of the present invention.

FIG. 5 illustrates a message flow diagram for establishing a dedicated channel between the base unit 12 and the local party 16a over link 22a in the system 10, according to an example of the present invention. For purposes of illustration, the base-unit 12 will communicate with the local parties 16 wirelessly according to a Bluetooth protocol, and FIG. 5 depicts Link Manager Protocol (LMP) control signaling on the asynchronous connection-oriented (ACL) logical transport of the Bluetooth link. Further, FIG. 5 assumes that the base unit 12 has previously established a communication with the remote party 14, and that the base unit 12 can only maintain one established dedicated channel with a local party 16 at any given time.

At step 102, the local party 16a performs a Baseband paging procedure with the base unit 12 to form a physical connection with the base unit 12. By initiating the paging procedure, the local party 16a will begin as the "master" of the Bluetooth connection, and the base unit 12 will begin as the "slave" of the connection. After the paging procedure is complete, at step 104, the local party 16a may request a connection with the base unit 12 by sending an LMP_host_connection_req protocol data unit (PDU) over the link 22a to the base unit 12, which the base unit 12 may receive at step 106.

After receiving the connection request at step 106, the base unit 12 may determine whether to accept the connection according to aspects of the present invention. For example, the base unit 12 may reject the local party's connection request by sending an LMP_not_accepted PDU if the base unit 12 has an active connection with any of the other local parties 16, in which case the local party 16a may (i) terminate the connection by sending an LMP_detach PDU and (ii) notify a user of the local party 16a that the base unit 12 rejected the connection. Alternatively, as illustrated in FIG. 5 at step 108, the base unit 12 may accept the local party's connection request by sending an LMP_accepted PDU if the base unit 12 does not have an active connection with any of the local parties 16. In turn, at step 110, the local party 16a may (i) receive the base unit's acceptance and (ii) notify a user of the local party 16a that the base unit 12 accepted the connection.

After receiving the connection request at step 106, the base unit 12 may also send information about its broadcast channel to the local party 16a. For example, if the base unit 12 rejects the connection with the local party 16a, the base unit 12 may send broadcast channel information along with the LMP_not_accepted PDU. Alternatively, if the base unit 12 accepts the connection with the local party 16a, the base unit 12 may send the broadcast channel information along with the LMP_accepted PDU. In either case, the base unit 12 may incorporate the broadcast channel information into the acceptance PDUs, or the base unit 12 may send the broadcast channel information in a separate PDU.

Either before or after accepting the connection with the local party 16a, the base unit 12 may also carry out various other functions relating to the connection setup. For example, at step 112, the base unit 12 may initiate a role switch with the local party 16a, so that the base unit 12 will become the "master" of the connection and the local party 16a will become the "slave" of the connection. The base unit 12 may request the role switch by sending the local party 16a an LMP_slot_offset PDU and an LMP_switch_req PDU, and the local party 16a may accept the role switch by sending the base unit 12 an LMP_accepted PDU.

As another example, at step 114, the base unit 12 may initiate authentication procedures with the local party 16a. As such, the base unit 12 may send to the local party 16a an LMP_au_rand PDU that contains a "challenge," and the local party 16a must then correctly respond to that "challenge" by sending an LMP_sres PDU that is based on a common link key between the base unit 12 and the local party 16a. However, if the base unit 12 and the local party 16a do not have a common link key, the base unit 12 may first need to initiate a pairing procedure by prompting a user for a PIN code and then sending an LMP_in_rand to the local party 16a. In turn, the local party 16a may prompt a user for a PIN code and then send an LMP_accepted to the base unit 12. Thereafter, the base unit 12 and the local party 16a may create a common link key by exchanging LMP_comb_key PDUs and then proceed to the authentication procedure discussed above. Further, if the authentication between the base unit 12 and the local party 16a is successful, the base unit 12 may also initiate encryption procedures with the local party 16a at step 116.

The base unit 12 may carry out one or more of the above setup functions before accepting the connection with the local party 16a, in which case the base unit's acceptance may depend upon successful completion of one of more of these functions. However, once the base unit has accepted the connection and completed the connection setup with the local party 16a, the base unit 12 and the local party 16a may exchange LMP_setup_complete PDUs at steps 118 and 120. Thereafter, the base unit 12 and the local party 16a may exchange bearer data (e.g., audio communication or video communication) over the connection.

Either the base unit 12 or the local party 16a may terminate the connection at any time by sending an LMP_detach PDU. For example, if there is a rejected role switch or a failed authentication, the base unit 12 or the local party 16a may terminate the connection by sending an LMP_detach. As another example, if the local party 16a has not sent bearer data over the connection for some predetermined amount of time, the base unit 12 may terminate the connection with the local party 16a by sending an LMP_detach PDU. As yet another example, if the base unit 12 receives a paging request and/or a connection request from a local party 16b with a higher priority than local party 16a, the base unit 12 may terminate the connection local party 16a by sending an LMP_detach PDU. Preferably, the base unit 12 will terminate the connection with the lower priority local party 16a before determining whether to accept the connection request from the higher priority local party 16b.

Exemplary embodiments of the present invention have been described above. Those skilled in the art will understand, however, that changes and modifications may be made to the embodiments described without departing from the true scope and spirit of the present invention, which is defined by the claims.

We claim:

1. A method of facilitating a conference communication between a remote party and a plurality of local devices, the method comprising:
   a base unit engaging in a communication with the remote party via a network;
   the base unit receiving from a first local device a request for a short-range wireless dedicated channel between the first local device and the base unit for transmitting data related to the communication; and
   in response to receiving the request from the first local device, the base unit (a) establishing a short-range wireless dedicated channel with the first local device only if a number of short-range wireless dedicated channels established between the base unit and the plurality of local devices is less than a predetermined threshold, and (b) sending to the first local device information about a broadcast channel over which the base unit transmits data related to the communication.

2. The method of claim 1, wherein the predetermined threshold is one.

3. The method of claim 1, further comprising:
   the base unit receiving given data related to the communication; and
   in response to receiving the given data, the base unit transmitting the given data over the broadcast channel.

4. The method of claim 3, further comprising:
   in response to receiving the given data, the base unit transmitting the given data to the remote party over the network.

5. The method of claim 3, further comprising:
   in response to receiving the given data, the base unit transmitting the given data over each established short-range wireless dedicated channel.

6. The method of claim 1, wherein the base unit establishing a short-range wireless dedicated channel with the first local device only if a number of short-range wireless dedicated channels established between the base unit and the plurality of local devices is less than a predetermined threshold comprises:
   the base unit establishing the short-range wireless dedicated channel with the first local device.

7. The method of claim 6, further comprising:
   the base unit detecting that the first local device has not transmitted data over the established short-range wireless dedicated channel for a predetermined time period and responsively releasing the established short-range wireless dedicated channel with the first local device.

8. The method of claim 6, further comprising:
   the base unit receiving from a second local device a request for a short-range wireless dedicated channel between the second local device and the base unit for transmitting data related to the communication, wherein the second local device has a higher priority than the first local device; and
   in response to receiving the request from the second local device, the base unit releasing the established short-range wireless dedicated channel with the first local device.

9. The method of claim 1, further comprising:
   the base unit sending to the first local device a notification indicating whether the short-range wireless dedicated channel with the first local device is established.

10. The method of claim 1, wherein each local device comprises a wireless conferencing device.

11. The method of claim 1, wherein each established short-range wireless dedicated channel comprises a Bluetooth channel, and wherein the broadcast channel comprises a Frequency Modulated channel.

12. A base unit for facilitating a conference communication between a remote party and a plurality of local devices, the base unit comprising:
   a remote communication interface for engaging in a communication with the remote party over a network;
   a local communication interface for engaging in a communication over at least one dedicated channel with a respective local device;

a broadcast transmitter for transmitting communications over a broadcast channel for receipt by a plurality of local devices;

a processor;

data storage; and program instructions stored in the data storage and executable by the processor to carry out functions including:

engaging in a communication with the remote party via the network;

receiving from a first local device a request for a short-range wireless dedicated channel between the first local device and the base unit for transmitting data related to the communication; and in response to receiving the request from the first local device, (a) establishing a short-range wireless dedicated channel with the first local device only if a number of short-range wireless dedicated channels established between the base unit and the one or more local devices is less than a predetermined threshold, and (b) sending to the first local device information about the broadcast channel over which the base unit transmits data related to the communication.

13. A method of engaging in a conference communication with a remote party and one or more local devices via a base unit, the method comprising:

a first local device sending to the base unit a request for a short-range wireless dedicated channel between the first local device and the base unit for transmitting data related to a communication with the remote party; and as a result of sending the request, the first local device (a) obtaining a short-range wireless dedicated channel from the base unit only if a number of short-range wireless dedicated channels established between the base unit and the one or more local devices is less than a predetermined threshold, and (b) receiving from the base unit information about a broadcast channel over which the base unit transmits data related to the communication.

14. The method of claim 13, wherein the predetermined threshold is one.

15. The method of claim 13, further comprising:

the first local device receiving, from the base unit over the broadcast channel, data related to the communication.

16. The method of claim 13, wherein the first local device obtaining a short-range wireless dedicated channel from the base unit only if a number of short-range wireless dedicated channels established between the base unit and the one or more local devices is less than a predetermined threshold comprises:

the first local device obtaining the short-range wireless dedicated channel.

17. The method of claim 16, further comprising:

the first local device transmitting, over the obtained short-range wireless dedicated channel with the base unit, data related to the communication.

18. The method of claim 13, further comprising:

the first local device receiving from the base unit a notification indicating whether the short-range wireless dedicated channel is established.

19. The method of claim 13, wherein the first local device sending the request for the short-range wireless dedicated channel comprises the first local device sending the request for the short-range wireless dedicated channel in response to a request by a user.

20. The method of claim 13, wherein the first local device sending the request for the short-range wireless dedicated channel comprises the first local device sending the request for the short-range wireless dedicated channel in response to detecting speech from a user.

21. The method of claim 20, further comprising:

the first local device buffering speech from the user until obtaining a short-range wireless dedicated channel from the base unit.

\* \* \* \* \*